Nov. 3, 1942   R. H. PARK   2,300,695
SAMPLE HOLDER FOR SPECTROPHOTOMETERS AND COLORIMETERS AND METHODS
OF COMPARING OPTICAL REFLECTING POWERS OF MATERIALS
Filed Nov. 7, 1939   3 Sheets-Sheet 1

INVENTOR
ROBERT H. PARK,
BY
ATTORNEY.

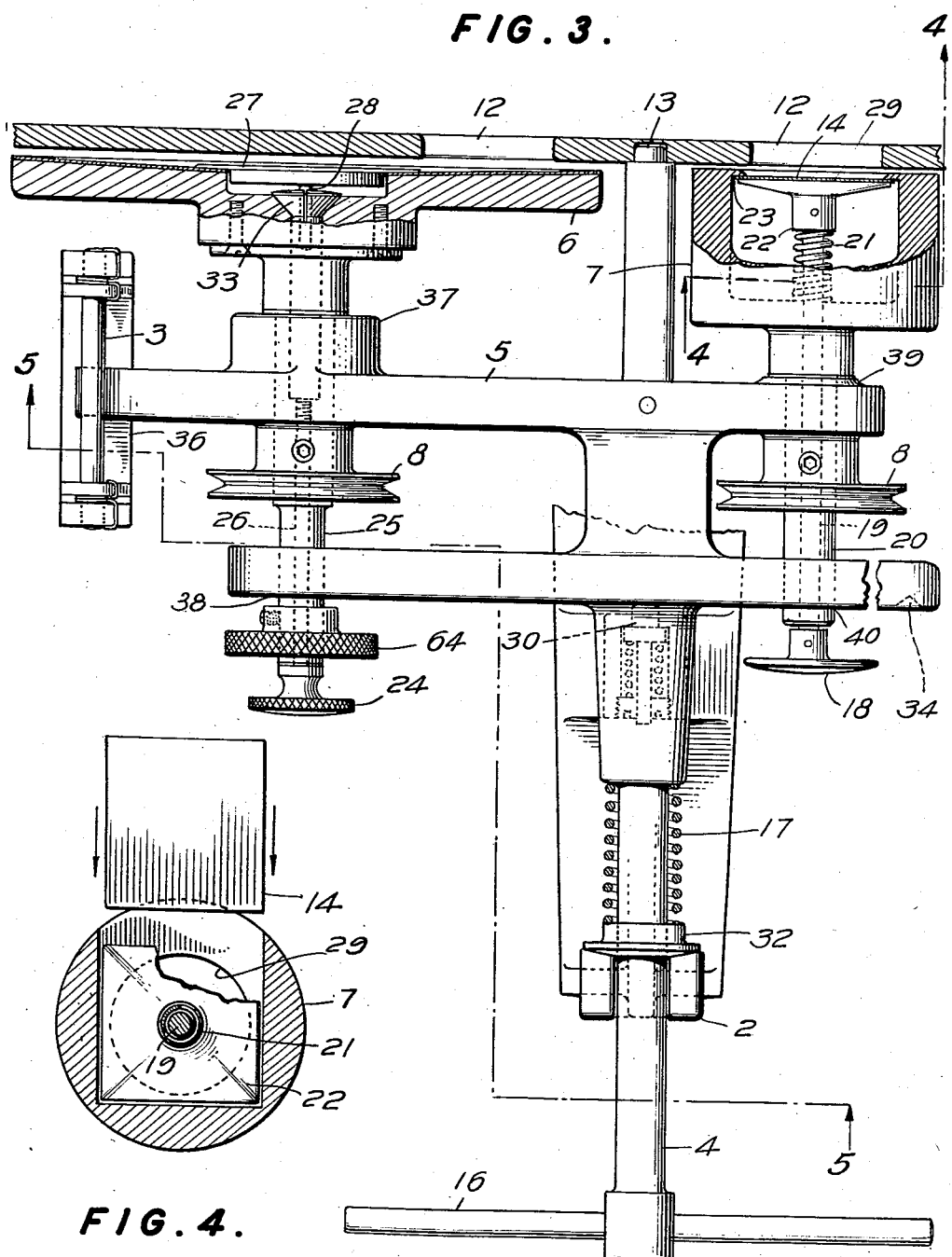

Nov. 3, 1942.   R. H. PARK   2,300,695
SAMPLE HOLDER FOR SPECTROPHOTOMETERS AND COLORIMETERS AND METHODS
OF COMPARING OPTICAL REFLECTING POWERS OF MATERIALS
Filed Nov. 7, 1939   3 Sheets-Sheet 3

INVENTOR.
ROBERT H. PARK,
BY John W. Lee.
ATTORNEY.

Patented Nov. 3, 1942

2,300,695

UNITED STATES PATENT OFFICE 2,300,695

SAMPLE HOLDER FOR SPECTROPHOTOMETERS AND COLORIMETERS AND METHOD OF COMPARING OPTICAL REFLECTING POWERS OF MATERIALS

Robert H. Park, Millington, N. J., assignor to American Cyanamid Company, New York, N. Y., a corporation of Maine Application November 7, 1939, Serial No. 303,198

8 Claims. (Cl. 88—14)

This invention relates to improvements in the methods and means for the comparison of color, shade or similar characteristics of sheet materials such as cloth or paper.

Particularly it relates to an improved sheet or flat sample holder for use in connection with electrical optical devices and the method of exposing a more truly representative area of such sheet materials to the viewing apertures of said optical devices. For example, the improved holder of the present invention can be used for the inspection or testing of said materials in connection with a colorimeter such as that described in the Sheldon U. S. Patent No. 1,971,317 or in connection with a flickering beam spectrophotometer such as that described in the Pineo U. S. Patents Nos. 2,107,836, 2,126,410 and 2,176,013.

This application is in part a continuation of my co-pending applications Serial No. 278,004 filed June 8, 1939, (Patent No. 2,265,002, issued December 2, 1941) and Serial No. 297,222 filed Sept. 30, 1939 (Patent No. 2,265,003, issued December 2, 1941).

It has been customary in the past when comparing samples of sheet materials to mount the samples in holders and continuously rotate the samples while being tested to overcome the effect of the uneven surface, weave, and so forth. However, such methods expose only a relatively small axial area of the total area of the sheet material to the testing and hence a representative result was not obtained. The holder of the present invention, like all the colorimeter and spectrophotometer holders consists essentially of two parts, one to hold the arbitrary standard in the light beam at one viewing aperture and one to hold the sample in the light beam from the other viewing aperture. For colorimeter use these two parts are preferably mounted on a single shaft which permits reversing the apertures through which the samples are viewed. In the holders of the prior art the arbitrary standard holder and the sample holder were identical in structure and by which flat or sheet materials were rotated about an axis substantially in line with the axis of the illuminating beams from the viewing apertures to expose equal areas to inspection. According to the present invention a device is provided which holds a sample of the material such as paper or cloth and which permits rotation in the manner that exposes a larger proportion of the flat surface to the viewing area of an optical device and at the same time reduces the errors due to unlevelness or other sources of randomness. In a preferred embodiment of the present invention the sample area viewed may easily be increased approximately 10 times or more over that for samples as previously mounted and which results in a three to one or greater reduction in random variation in reflectance associated with unlevelness and so forth. Therefore it is an advantage of the present invention that more precise measurement or comparison of the surface of paper or cloth samples can be obtained by inspection with spectrophotometers or colorimeters than can be obtained by the prior methods in which flat samples are rotated about an axis substantially in line with the axis of the illuminating beam.

It is also an advantage of the present invention that a sample holder is provided that is adapted for holding a wide variety of annular samples of flat or sheet materials to present a uniform level annular surface of such materials for inspection with colorimeters or spectrophotometers. There is little difficulty encountered when annular samples of very stiff materials such as cardboard or heavy paper are rotated before a viewing aperture of a colorimeter or a spectrophotometer to test the uniformity of the annular surface. However, when it is desired to examine annular samples of very thin or flexible materials such as tissue paper or cloth, there is a great deal of difficulty encountered. If annular or disk shaped samples of these flexible materials are rotated the rotation is accompanied by fluttering or waving which prevents an accurate examination of the annular surface. These flexible materials even when backed up by a flat disk of metal or other rigid material continue to flutter when rotated unless the outer periphery is securely fastened to the metal disk. The fastening of the outer periphery of such flexible materials is not a satisfactory solution of the problem because in addition to being time-consuming it is very difficult to obtain a perfectly level annular surface free from wrinkles which would cause the readings to be inaccurate. I have discovered that a disk of metal or other rigid material which has a slightly beveled or concave surface to which an annular sample of flexible material can be fastened or centered by its inner periphery to the disk and when the disk and sample are rotated centrifugal force will hold the flexible material against the face of the disk to present a perfectly smooth or uniform annular surface of the flexible material for inspection. While the concave or beveled disk is particularly suited for rotating annular samples of flexible materials it can also be used to rotate annular samples of heavy or stiffer paper materials and the like.

This preferred embodiment of the present invention is especially suited for use with colorimeters since it is necessary to reverse the apertures through which the sample and the standard are viewed in order to obtain a reading. However, it can also be used with spectrophotometers wherein the readings may be obtained without reversing the apertures.

The arrangement and operation of the invention will be apparent by referring to the following drawings in which:

Fig. 3 is a top plan view of the holder illustrating the position from which the samples are viewed;

Fig. 4 is a detailed sectional view taken along the line 4—4 of Fig. 3;

Figure 1:
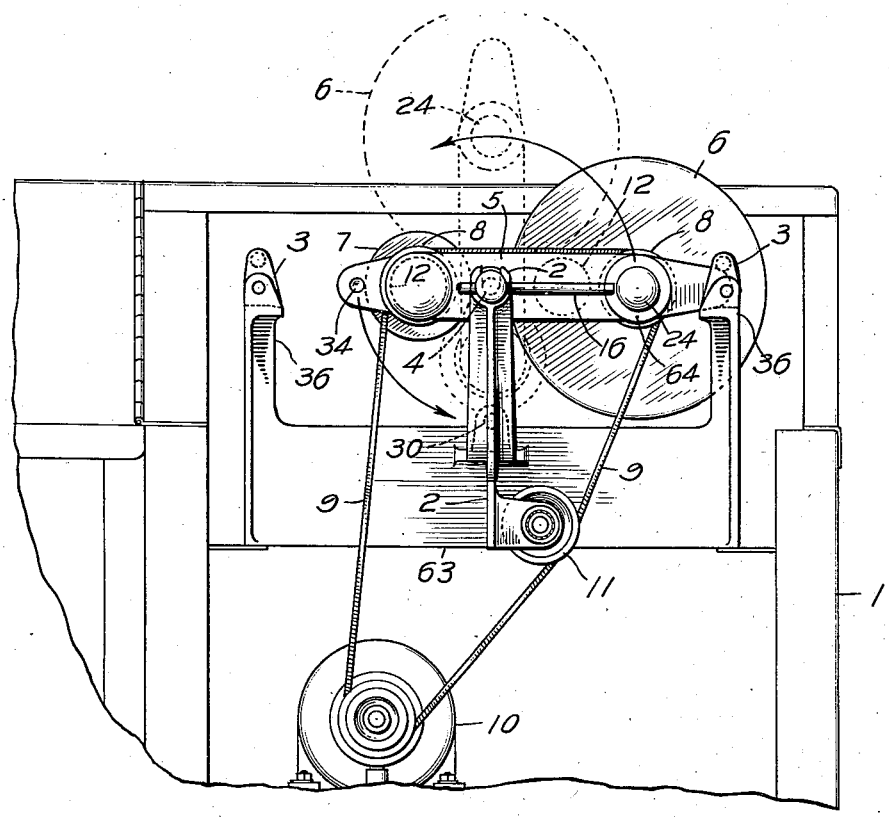
Fig. 1 is a front elevation of the sample holder attached to a colorimeter.

Referring now particularly to Fig. 1, the outside wall or framework 1 of a colorimeter is shown having mounted therein the inner frame structure 63, the central portion of which has the vertically extending shaft support 2 and the outer edges having the vertically extending members 36, each having a spring actuated frame locking means 3 adapted to engage one end of chassis member 5. A shaft 4 is shown having mounted thereon the chassis member 5 one end of which carries the standard sample holder 7 and the other a disk sample holder 6. One end of the shaft 4 is supported by the shaft support 2, the opposite end being seated in the hole 13 of the framework 1 (shown in Fig. 2). The chassis 5 is so designed that the central portion of the standard sample holder 7 is directly opposite the viewing aperture 12 (shown in dotted line) and the annular surface of the disk sample holder 6 is opposite the other aperture 12 (shown also in dotted line). The sample holders 6 and 7 are rotated by means of the elastic spring drive belt 9 which passes around the pulleys 8 and over the idler 11, and is driven by the motor 10. When the handle 16 attached to the shaft 4 is rotated vertically the entire chassis is rotated as indicated by the arrows and may be held in a neutral position as indicated by the dotted lines by engagement of the spring and ball locking means 30 with identation 34 at one end of the chassis, or the rotation can be carried through 180° to completely reverse the positions of the sample holders and viewing apertures. This chassis rotation can be accomplished while the sample holders are also being vertically rotated as the elastic spring drive belt 9 remains intact and is prevented from fouling by means of the idler roller 11.

The sample holder is shown more in detail in Fig. 3 and with the sample holders and viewing apertures in the reverse position of that shown in Fig. 1.

The shaft 4 is shown with one end seated in the opening 13, of the framework 1, the other end being supported by the U-shaped portion of the shaft support 2. The action of the spring 17 upon the collar 32 serves to hold the sample holders 6 and 7 the correct distance from the viewing apertures 12. The disk shaped sample holder 6 is connected to the hollow drive shaft 25, said hollow shaft being rotatably mounted on the chassis 5 by means of the bearings 37 and 38. These bearings are preferably of the ball bearing type to insure a smooth rotary action. This hollow shaft also carries the drive pulley 8 positioned between the bearings 37 and 38 in a manner that prevents longitudinal motion. A rod 26 housed in the hollow shaft 25 carries a knurled knob 24 on one end and a collet 33 on the other end adapted to engage the pin 28 of the keeper plate 27. The knurled knob 64 on the hollow shaft 25 can be rotated to cause engagement of the rod 26 with the hub portion of the knurled knob 24 and prevent separate rotation of the rod or when loosened permits rotation of the rod independently of the hollow shaft.

The annular surface of the disk sample holder 6 is shown in the position as regards the viewing aperture 12 when readings are made.

It will be noted that one end of the chassis is engaged by the spring actuated locking means 3 on the vertical support member 36 to hold the chassis in a horizontal position such that the annular surface of the disk sample holder is positioned opposite one aperture 12 while the circular opening 29 of the standard sample holder 7 is directly opposite the other aperture 12. The standard sample holder 7 is connected to the hollow drive shaft 20, said shaft being rotatably mounted on the chassis 5 by means of the bearings 39 and 40. These bearings are also preferably of the ball bearing type. The hollow drive shaft 20 has a drive pulley 8 positioned between the bearings 39 and 40 in such a manner that longitudinal motion of the shaft is prohibited.

The rod 19 is enclosed in the hollow drive shaft 20, one end of the rod having the knob handle 18, the other end terminating inside the tubular portion of the standard sample holder 7 (Figs. 2 and 3), and having fastened thereto the plate member 22, the outer face of this plate member being slightly larger than the circular opening 29 in the standard sample holder. When the handle 18 is pulled outward and a square sample of flat material 14 is inserted into the sample holder as indicated in Fig. 4, and the handle released the spring 21 forces the plate 22 forward to hold the outer portion of the sample 14 against the inside shoulders 23 of the sample holder 7. Thus the entire circular opening 29 is covered by the flat sample 14. This circular opening or window 29 in the standard sample holder 7 is slightly larger than the viewing aperture 12 of the colorimeter.

Figure 2:
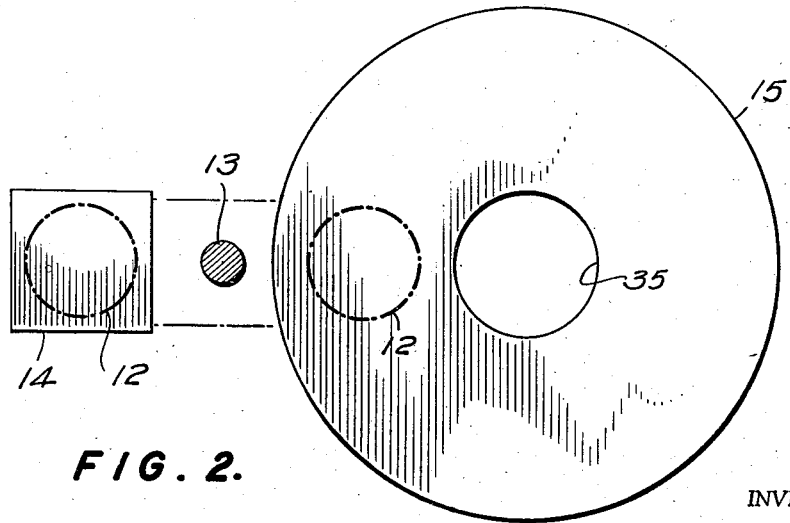
Fig. 2 is an elevation of a standard sample of sheet material and a disk or annular sample of unknown sheet material for comparison, showing the positions relative to viewing apertures of an optical device.

In Fig. 2 a square reference sample of sheet material 14 is shown in position relative to a colorimeter viewing aperture 12 and an annular sample of sheet material 15 is shown in its position relative to the other viewing aperture 12. Rotation of the sample 14 about an axis substantially in line with the viewing aperture 12 will continuously expose only one area on the sample 14, while rotation of the annular sample 15 about an axis located in the center of the inner periphery 35 will continuously expose successive areas on the sample 15 to the other viewing aperture 12, which follows a closed path around the entire annular surface of the sample 15 and in the size sample shown the path represents a total area of approximately 10 times the area of the viewing aperture.

Figure 5:
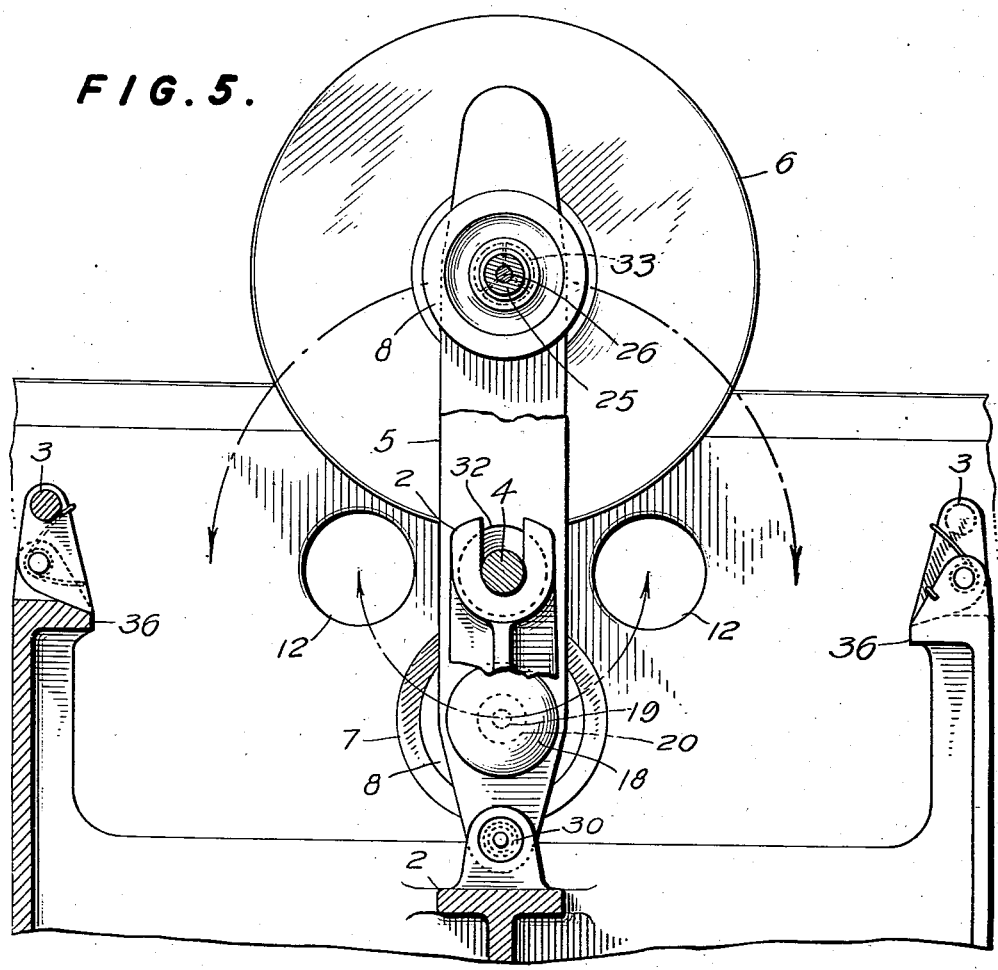
Fig. 5 is a sectional view taken along the line 5—5 of Fig. 3 but showing the holder in a neutral position.
Figure 6:
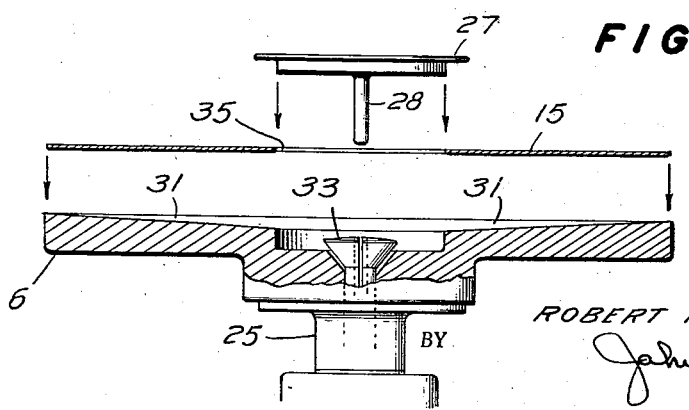
Fig. 6 is a detailed sectional view of the disk sample holder.

The improved disk shaped sample holder is more fully illustrated in Fig. 6. The disk 6 may be constructed of any suitable material, however I prefer to use a light weight metal such as aluminum. An important feature of the structure is the slightly beveled or concave surface 31. To place an annular sample of flat or sheet material in position for testing it is not necessary to disengage the entire sample holder from the colorimeter. By rotation of the handle 16 through 90 degrees the chassis 5 may be placed in the position illustrated in Fig. 5 or by the dotted lines in Fig. 1. The chassis is held in this vertical position by means of ball and spring locking means 30 and the indenture 34 on one end of the chassis. In this position annular samples of flat or sheet material can be placed upon or removed from the disk shaped holder as the case may be. Referring again to Fig. 6 the manner of placing the sample on the disk will readily be apparent. The annular sample 15 is placed against the beveled surface 31, the inner periphery 35 of the annular sample being in alignment with the circular seat for the keeper plate 27. The pin 28 is inserted in the opening of the collet 33 whereupon the outer rim of the keeper plate 27 holds the inner periphery of the annular sample against the disk. By rotating the knurled knob 24 (Fig. 3) to the right the collet 33 is closed engaging the pin 28 to hold the keeper plate securely in position. It is noted that only the inner periphery of the annular sample is fastened to the disk, the outer or annular surface of the sample being held by centrifugal force closely against the beveled surface when the disk and sample are rotated.

In using this improved holder to make measurements or comparisons of the surfaces of flat or sheet materials such as cloth or paper the operation may be as follows:

The holder is placed in the position with the main chassis vertical as shown in Fig. 5 (or by dotted line Fig. 1). An annular sample 15 of the material to be tested is placed upon the concave surface 31, the keeper 27 is placed in position and secured by means of the pin 28 and collet 33. The standard sample holder 7 contains a square reference sample held in position as indicated by Figs. 3 and 4.

The handle 16 is then rotated 90 degrees. At this point the spring frame locking means 3 holds the main chassis in a horizontal position as shown in Fig. 3. The holders 6 and 7 are now rotated by means of the motor 10 and the spring drive belt 9, whereupon centrifugal force holds the annular sample closely against the beveled surface of the disk 6, while being viewed through the aperture 12. The light strikes the samples and is reflected and impinges upon photoelectric cells or other electrical measuring means which in turn permit measurement with a suitable indicating device such as a galvanometer. The samples are interchanged from the position as shown in Fig. 2 to the position as shown in Fig. 3 by rotating the handle 16 through 180 degrees and a second galvanometer reading taken. The difference in galvanometer deflection serves as a basis upon which a comparison of the surfaces can be made.

As pointed out heretofore when the color, texture, etc., of the surfaces of flat or sheet materials are tested or compared by use of a spectrophotometer it is not necessary to reverse the samples and the viewing apertures to obtain a reading.

What I claim is:

1. An apparatus for holding samples of sheet materials for exposing a standard and a sample of sheet material to the viewing aperture of electrical optical apparatus which comprises a frame work having two viewing apertures of equal size spaced apart and located in the same plane, a shaft mounted in said frame work intermediate of the apertures, said shaft having rigidly fastened thereto a support member, one end of said support member having mounted thereon a rotatable standard sheet sample holder, the axis of said holder passing through the corresponding viewing aperture and adapted to expose a uniform axial area of a standard of sheet material to the light beam from one viewing aperture of the frame work, the other end of said support member having mounted thereon a rotatable disk sample holder relatively large in comparison to the rotary standard sheet holder, the axis of said disk sample holder being spaced from the corresponding viewing aperture and having means for holding an annular sheet of material against the surface thereof, said disk being positioned with respect to the other aperture so that when an annular sheet of material is held against the surface of the disk only a portion of the annular surface is exposed to light from the viewing aperture.

2. A holder for annular samples of flexible sheet materials which consists of a disk having a slightly beveled face and means for securing the inner periphery of an annular sample of flexible material to the center of the disk, means for mounting said disk on a shaft and means for rotating vertically the disk and sample at a speed sufficient to cause the annular sample of flexible sheet material to be held closely against the face of the disk by centrifugal force.

3. The improvement in the method of comparing optical reflecting powers of materials having extended surfaces which comprises measuring photoelectrically reflectance produced by light impinging on a portion of the surface of a standard sample of such material through a viewing aperture of a certain size and on a non-axial portion of the surface of an unknown sample of such material through a viewing aperture of equal size while effecting rotary movement of the unknown sample at a speed suitably related to the rate of response of the measuring instrument and such that the area viewed is equal to the area of the viewing aperture but extends along a closed path around the non-axial surface of the unknown sample and substantially increases the total area viewed beyond that possible by viewing an axial area of a rotating sample through an aperture of equal size.

4. A method according to claim 3 in which both the standard sample and the unknown sample are rotated while being viewed.

5. The improvement in the method of comparing optical reflecting powers of sheet materials which comprises measuring photoelectrically reflectance produced by light impinging on a portion of the surface of a standard sample of such material through a viewing aperture of a certain size and on a non-axial portion of the surface of an unknown sample of such material through a viewing aperture of equal size while effecting rotary movement of the unknown sample at a speed suitably related to the rate of response of the measuring instrument and such that the area viewed is equal to the area of the viewing aperture but extends along a closed path around the non-axial surface of the unknown sample and substantially increases the total area viewed beyond that possible by viewing an axial area of a rotating sample through an aperture of equal size.

6. The improvement in the method of comparing optical reflecting powers of flat materials which comprises measuring photoelectrically the reflectance produced by light impinging on a portion of the surface of a standard sample of such material through a viewing aperture of a certain size and on a non-axial portion of the surface of an unknown sample of such material through a viewing aperture of equal size while effecting rotary movement of both the standard sample and unknown sample, said rotary movement being on an axis, at a speed suitably related to the rate of response of the measuring instrument and such that the area viewed is equal to the area of the viewing aperture and extends along a closed path around the non-axial surface of the unknown sample and substantially increases the total area viewed beyond that possible by viewing an axial area of a rotating sample through an aperture of equal size.

7. The improvement in the method of comparing the color of fabric sheet materials which comprises measuring photoelectrically reflectance produced by light impinging on a standard sample of fabric sheet material through a viewing aperture of a certain size and on a non-axial portion of the surface of an annular unknown sample of fabric sheet material through a viewing aperture of equal size, while effecting rotary movement of both the standard sample and the unknown sample, said rotary movement of the standard sample being such that the reflectance area rotates about a central axis and the rotary movement of the unknown sample being at a speed suitably related to the rate of response of the measuring instrument and such that the area viewed is equal to the area of the viewing aperture but extends along a closed path around the non-axial surface of the unknown sample and substantially increases the total area viewed beyond that possible by viewing an axial area of a rotating sample through an aperture of equal size.

8. The improvement in the method of comparing the color of dyed cloth which comprises viewing an area of an arbitary standard of dyed cloth through a viewing aperture of a certain size and simultaneously viewing a non-axial area of an unknown sample of dyed cloth through a viewing aperture of equal size, the total area viewed on the unknown sample being large in comparison to the viewing aperture, this result obtained by effecting a rotary movement of the unknown sample relative to the viewed area and measuring the optical differences electrically.

ROBERT H. PARK.